United States Patent [19]
Hotton

[11] 4,051,218
[45] Sept. 27, 1977

[54] METHOD OF WELDING PLASTIC SEAMS

[75] Inventor: Joseph G. Hotton, Sterling Heights, Mich.

[73] Assignee: Neumann Engraving Company, Madison Heights, Mich.

[21] Appl. No.: 681,980

[22] Filed: Apr. 30, 1976

[51] Int. Cl.[2] .................. B29C 17/00; B29D 9/00; B29F 5/00
[52] U.S. Cl. .................... 264/248; 156/304; 156/306; 264/293; 264/296; 264/322
[58] Field of Search ............. 264/157, 158, 160, 296, 264/320, 248, 234, 293, 345, 321, 294; 425/383, 385; 156/157, 304, 306, 322

[56] References Cited

U.S. PATENT DOCUMENTS

| 2,505,647 | 4/1950 | Norris | 156/306 |
| 2,631,509 | 3/1953 | Whytlaw | 156/306 |
| 2,749,261 | 6/1956 | Hardison | 264/248 |
| 3,013,925 | 12/1961 | Larsen | 156/306 |
| 3,219,742 | 11/1965 | Reinert | 264/248 |
| 3,395,204 | 7/1968 | Olsson et al. | 264/146 |
| 3,902,943 | 9/1975 | Debliek | 264/248 |

FOREIGN PATENT DOCUMENTS

| 543,133 | 12/1955 | France | 83/16 |

*Primary Examiner*—Willard E. Hoag
*Attorney, Agent, or Firm*—Cullen, Settle, Sloman & Cantor

[57] ABSTRACT

A method of welding together two thermoplastic surfaces to form a strong watertight bond therebetween comprising the steps of serrating the two surfaces while simultaneously melting the serrations formed therein and pressing the two surfaces together, ridge to ridge and valley to valley, to collapse the ridges and cause the molten thermoplastic material to flow into the valleys until a single continuous watertight seam is formed therebetween.

7 Claims, 10 Drawing Figures

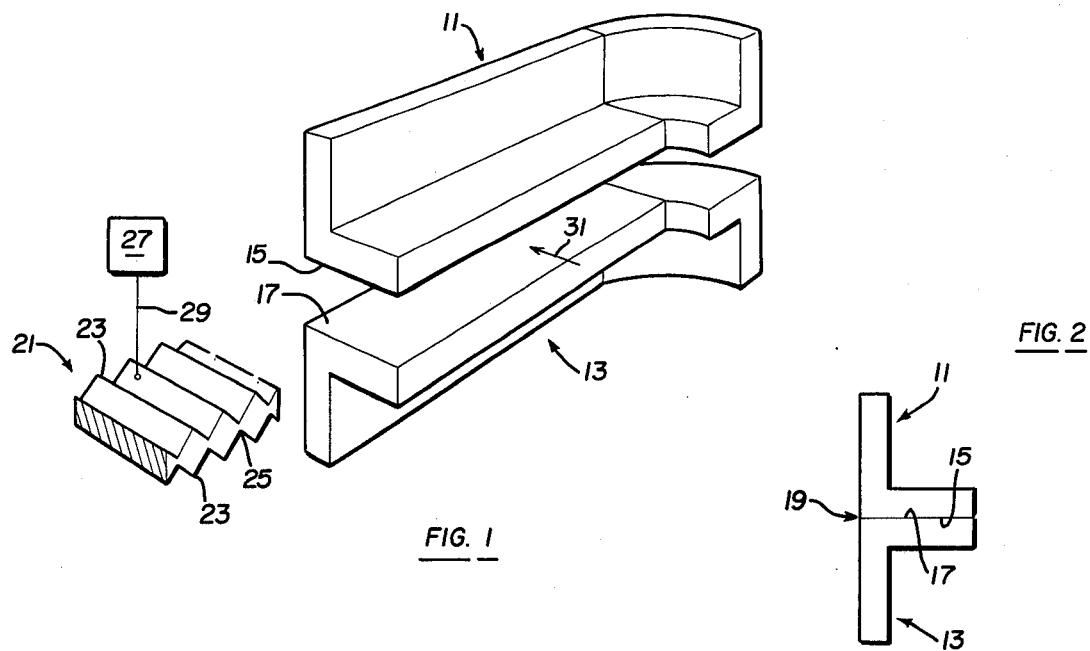
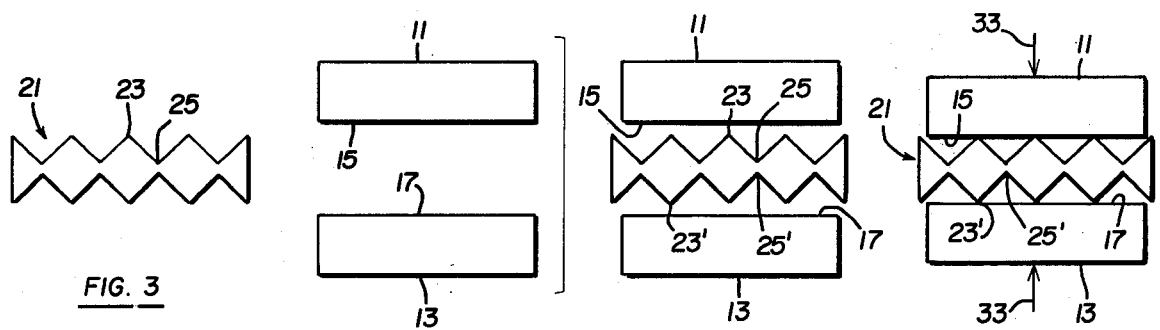
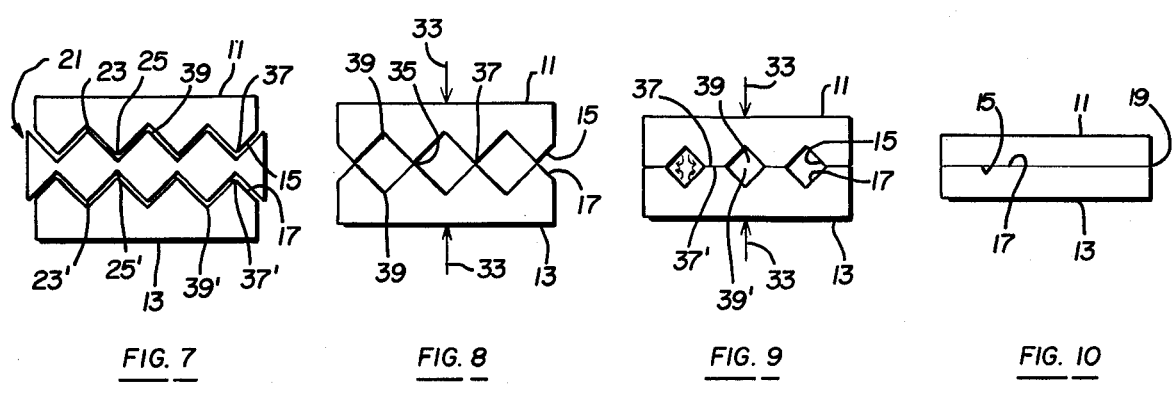

METHOD OF WELDING PLASTIC SEAMS

BACKGROUND OF THE INVENTION

The invention relates to a method of welding plastic seams and, more particularly, to a method for bonding together two thermoplastic surfaces to form a single continuous watertight seal therebetween.

The prior art has employed various methods for forming a bond between two thermoplastic surfaces. The use of a heated wire, blade or similar element to melt the plastic at the surface and then press the surfaces together to form a bond is well-known. Similarly well-known, is the fact that such bonds often contain air pockets, areas in which no bond has been formed, or other defects which destroy the integrity of the seam, weaken the bond, and permit leakage of water or similar fluids therethrough.

In many applications, such as in the forming of acrylic housings to be used as tail light covers or lenses on vehicles and the like, the seam must be relatively strong and watertight in order to prevent damage to the electrical lights and circuitry housed under the lens cover.

The method of the present invention solves the problems of the prior art and produces a high-strength, continuous, watertight seal between the thermoplastic surfaces.

SUMMARY OF THE INVENTION

The present invention contemplates a method of welding together two thermoplastic surfaces to form a strong watertight bond therebetween comprising the steps of serrating the two surfaces while simultaneously melting the serrations formed therein and pressing the two surfaces together, ridge to ridge and valley to valley, to collapse the ridges and cause the molten thermoplastic material to flow into the valleys until a single continuous watertight seam is formed therebetween.

The serrations are formed with a serrated blade which is heated to a temperature considerably above the melting point of the thermoplastic material. The blade is removed and the two surfaces to be welded together are pressed together such that the ridges and valleys of the first surface are directly opposite corresponding ridges and valleys of the second surface so that pressure applied thereto will cause the ridges to collapse and flow into adjacent valleys until the ridges and valleys are merged to form a single continuous watertight seam.

The bond formed by the method of the present invention has an extremely high strength, contains no air pockets or non-welded areas tending to weaken the bond, and is impervious to the passage of liquids therethrough. Such bonds are extremely useful in forming high strength watertight elements such as the lens housings used as tail lights for motor vehicles but is similarly useful in any type of application wherein a first thermoplastic surface is to be securely bonded to a second thermoplastic surface.

Other advantages and meritorious features of the present invention will be more fully understood from the following description of the drawings and preferred embodiment, the appended claims and the drawings in which;

BRIEF DESCRIPTION OF THE DRAWINGS

FIG. 1 is a fragmentary perspective view of two sections of thermoplastic material which are to be bonded together by the method of the present invention along with a fragmentary perspective view of a heatable serrated blade assembly;

FIG. 2 is a cross-sectional view of the two sections of FIG. 1 after they have been bonded together by the method of the present invention;

FIG. 3 is a schematic representation of a lateral portion of the serrated blade assembly of FIG. 1;

FIG. 4 is a schematic representation of a lateral portion of two thermoplastic surfaces spaced apart to receive therebetween the serrated blade assembly of FIG. 3;

FIG. 5 is a schematic representation of the two thermoplastic surfaces of FIG. 4 with the serrated blade of FIG. 3 inserted therebetween;

FIG. 6 is a schematic representation of the two surfaces of FIG. 4 pressed toward one another to contact the serrated blade assembly of FIG. 3;

FIG. 7 shows a schematic representation of the two thermoplastic surfaces after they have been serrated and as the blade of FIG. 3 is about to be removed from therebetween;

FIG. 8 is a schematic representation of the two serrated surfaces of FIG. 7 having been pressed into initial contact, ridge to ridge and valley to valley;

FIG. 9 is a schematic representation of the two serrated surfaces of FIG. 8 after additional pressure has been applied to partially collapse the ridge portions and cause the molten material to flow into the valleys; and FIG. 10 represents the two thermoplastic surfaces of FIG. 9 after sufficient pressure has been applied to collapse all of the ridges to fill all of the valleys so that a single, unitary, continuous, high-strength, water-tight seal has been formed therebetween.

DESCRIPTION OF THE PREFERRED EMBODIMENT

FIG. 1 shows a fragmentary portion of a first section 11 and a second section 13 of a tail light lens such as the type typically used on automobiles and the like. The two sections 11, 13 are to be welded together to form an integral unit. The first section has a first relatively flat surface 15 which is to be weldably bonded to an opposed relatively flat surface 17 of the second section to bond the two surfaces 15, 17 and hence the two sections 11, 13 together at the seam indicated by the reference numeral 19 in FIG. 2.

The sections 11, 13 of FIG. 1 may represent any type of thermoplastic material and, the choice of materials useable with the method of the present invention is well within the scope of those skilled in the art. In the preferred embodiment, the two sections 11, 13 are formed from a weldable acrylic thermoplastic material having a melting point of approximately 250° F, examples of which include modified or unmodified acrylic plastics whose major component is methyl methacrylate. Such plastics are generally transparent or translucent, light weight, breakage resistant, weather resistant and easy to maintain.

FIG. 1 also shows a fragmentary view of a portion of an electrically heated serrated cutting blade assembly represented by the reference numeral 21. The serrated blade 21 has a plurality of ridge portion 23 and a plurality of alternate valley portions 25 between adjacent ridge portions 23. The blade 21 may be heated by any means known in the art and, in the preferred embodiment disclosed herein, the blade 21 may be heated electrically as by an embedded resistor or the like. The blade 21 is shown as being connected to a power source 27 by means of an electrical conductor 29, as known in the art. When the serrated blade 21 is electrically heated, it reaches and maintains a temperature of approximately 700° F, although different temperatures could be used depending upon the thermoplastic material to be welded as known in the art. This temperature will allow the heated blade 21 to melt the plastic of the surfaces 15, 17 to form the molten serrations therein in less than a second, for example, in one-fourth of a second when pressure is applied to the surfaces 15, 17 and the material is acrylic plastic having a melting point of approximately 250° F.

The first and second thermoplastic surfaces 15, 17 shown in FIGS. 4-10 represent a transverse or lateral section looking in the direction of the arrow 31 in FIG. 1 although only the surface portions of the sections 11, 13 are shown for the sake of clarity. The method of the present invention will be described with reference to FIGS. 3-10 respectably. FIG. 3 represents an end view, looking in the direction of arrow 31 in FIG. 1, of the serrated blade assembly 21 which can be heated, electrically or otherwise, to a temperature of approximately 700° F. The arrow in FIG. 3 indicates that the serrated blade assembly 21 is inserted between the lower bonding surface 15 of the first section 11 and the upper bonding surface 17 of the second section 13 as indicated in FIG. 4. FIG. 5 shows the serrated blade assembly 21 inserted between the surfaces 15, 17 and it will be noted that the serrated assembly 21 is designed such that the peaks and valleys 23, 25 on one side of the blade assembly 21 are directly opposite corresponding peaks and valleys 23', 25' on the opposite side of the blade assembly 21.

FIG. 6 illustrates that pressure may be applied to the sections 11, 13 so that the lower surface 15 of the first section 11 contacts the peaks or ridges 23 of the upper surface of the serrated blade assembly 21 while the lower surface 17 of the second section 13 contacts the corresponding opposite peaks or ridges 23' on the under surface of the serrated blade assembly 21. The application of pressure is indicated by the arrows 33 and the pressure may be applied by any type of press, clamping means, or any similar type of pressure applying means known in the art.

When the blade assembly 21 is heated and pressure is applied to the two sections 11, 13, or to opposite sides of the surfaces 15, 17, the thermoplastic material will melt until the shape of the surfaces 15, 17 conforms to the pattern of serrations in the blade assembly 21 as illustrated in FIG. 7. The blade assembly 21 is then removed, as by removing the pressure and separating the sections 11, 13, and the under surface 15 of the first section 11 and the upper surface 17 of the second section 13 take on the serrated pattern of the previously removed blade assembly 21. The sections 11, 13 remain aligned such that the ridges 37 and valleys 39 of the surface 15 are aligned directly opposite corresponding ridges 37' and valleys 39' of the surface 17, although precise alignment is not required for effective operation.

FIG. 8 indicates that pressure, as indicated by the arrows 33, is again applied to bring the two surfaces 15, 17 together and FIG. 8 indicates the position whereat the opposed ridges have just begun to touch one another, as indicated by the reference numeral 35. As even further pressure is applied, the relatively molten ridges which initially contacted one another at 35 collapse upon each other and the relatively molten thermoplastic material flows from the ridges into the valleys on either side of the ridges so as to gradually fill the valleys as the ridges are collapsed. FIG. 9 shows that a substantial portion of the thermoplastic material has flowed from the collapsed ridges indicated by 37, 37' into the adjacent valleys 39, 39' so as to gradually fill the valleys to form a unified seam. As further pressure is applied, the ridges 37, 37' collapse entirely causing the relatively molten thermoplastic material to flow into adjacent valleys 39, 39' until all of the valleys 39, 39' have been filled resulting in a single continuous unitary seam 19 between the two sections 11, 13 as indicated in FIG. 10. This seam 19 has a relatively high strength; is free from air pockets and similar defects; and is watertight.

With this detailed description of the method of the present invention, it will be obvious to those skilled in the art that various modifications can be made without departing from the spirit and scope of the invention which is limited only by the appended claims.

I claim:

1. A method of welding together first and second thermoplastic surfaces to form a strong watertight bond therebetween comprising the steps of simultaneously serrating the first and second surfaces by simultaneously softening and shaping said surfaces with a heated forming element interposed therebetween to form ridges and valleys on each of said surfaces; withdrawing said forming element; and thereafter pressing the first and second surfaces together, with the ridges of the first surface substantially opposite and aligned with the ridges of the second surface to collapse the ridges and to flow the softened thermoplastic material into the valleys until a single continuous watertight seam is formed therebetween.

2. The method of claim 1 further characterized in that said withdrawing step includes the step of separating said surfaces prior to removing said blade.

3. The method of claim 2 further characterized in that said pressing step is performed not later than concurrently with the step of maintaining the ridges and valleys of said first surface aligned with respective ridges and valleys of said second surface.

4. The method of claim 3 further characterized in that said thermoplastic material is an acrylic with a melting point of approximately 250° F and said step of heating the blade contemplates heating said blade to approximately 700° F.

5. The method of claim 1 further characterized in that said step of simultaneously serrating includes the steps of inserting a serrated blade between the first and second surfaces to be bonded together, contacting the blade with said first and second surfaces, and heating the blade to melt the thermoplastic material of the surfaces to form the serrations therein.

6. The method of claim 5 further characterized in that said contacting step includes pressing the first and second surfaces toward each other and against opposite sides of the serrated blade while heating said blade to form said serrations.

7. The method of claim 6 further characterized in that said blade has the ridges of the side contacting said first surface directly opposed to the ridges of the opposite side and the valleys of the side contacting said first surface directly opposed to the valleys of the opposite side of said blade such that after said blade is removed from between said surfaces, the ridges and valleys of one surface are aligned with respective ridges and valleys of said second surface.

* * * * *